US012652531B2

(12) United States Patent
Morishita et al.

(10) Patent No.: US 12,652,531 B2
(45) Date of Patent: Jun. 9, 2026

(54) INFORMATION PROCESSING DEVICE, INFORMATION PROCESSING SYSTEM, ELECTRONIC DEVICE, COMMUNICATION MODULE, INFORMATION PROCESSING METHOD, AND RECORDING MEDIUM

(71) Applicant: Panasonic Intellectual Property Management Co., Ltd., Osaka (JP)

(72) Inventors: Tatsuya Morishita, Shiga (JP); Masaaki Yoshikawa, Osaka (JP); Michihiro Matsumoto, Kyoto (JP); Hiroto Kanda, Osaka (JP); Ayumi Sasaki, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 361 days.

(21) Appl. No.: 18/249,006

(22) PCT Filed: Oct. 12, 2021

(86) PCT No.: PCT/JP2021/037666
§ 371 (c)(1),
(2) Date: Apr. 13, 2023

(87) PCT Pub. No.: WO2022/085510
PCT Pub. Date: Apr. 28, 2022

(65) Prior Publication Data
US 2023/0379706 A1 Nov. 23, 2023

(30) Foreign Application Priority Data
Oct. 21, 2020 (JP) ................................ 2020-176863

(51) Int. Cl.
*H04W 12/06* (2021.01)
*H04W 12/69* (2021.01)

(52) U.S. Cl.
CPC ........... *H04W 12/06* (2013.01); *H04W 12/69* (2021.01)

(58) Field of Classification Search
CPC .... H04W 12/06; H04W 12/69; H04L 67/303; H04L 67/51
See application file for complete search history.

(56) References Cited

U.S. PATENT DOCUMENTS 6,220,768 B1 * 4/2001 Barroux .................. H04L 67/51
                                                        709/224
6,789,111 B1 * 9/2004 Brockway ............. H04L 69/329
                                                        710/72

(Continued)

FOREIGN PATENT DOCUMENTS

CN 109541950 A 3/2019
CN 112997461 A * 6/2021 .......... H04L 65/1104
(Continued)

OTHER PUBLICATIONS

Extended European Search Report dated Feb. 21, 2024 issued in the corresponding European Patent Application No. 21882651.9.
(Continued)

*Primary Examiner* — Charles T Shedrick
(74) *Attorney, Agent, or Firm* — Rimon P.C.

(57) ABSTRACT

An information processing device includes a communicator and a processor. The processor determines an execution procedure including at least one of a connection procedure and a registration procedure. Determination processing includes first processing, second processing, and third processing. In the first processing, a communicator is caused to transmit, to an electronic device, a request signal requesting identification information of the electronic device and identification information of a communication module. In the second processing, a response signal responding to the request signal is received from the communication module
(Continued)

via the communicator. In the third processing, the execution procedure is determined based on: whether the response signal has been received; and when the response signal has been received, the identification information included in the response signal.

14 Claims, 5 Drawing Sheets

(56) References Cited

U.S. PATENT DOCUMENTS

| | | | | |
|---|---|---|---|---|
| 8,984,612 | B1 * | 3/2015 | Gat | G06F 16/954 |
| | | | | 709/224 |
| 10,015,236 | B2 * | 7/2018 | Hong | H04L 67/34 |
| 11,076,281 | B1 * | 7/2021 | Yau | H04W 8/12 |
| 11,690,040 | B2 * | 6/2023 | Nayak | H04L 65/1073 |
| | | | | 455/435.1 |
| 12,282,764 | B2 * | 4/2025 | Shimomoto | G07F 19/206 |
| 2002/0161826 | A1 * | 10/2002 | Arteaga | G06F 16/9574 |
| | | | | 709/213 |
| 2004/0098515 | A1 | 5/2004 | Rezvani et al. | |
| 2006/0264206 | A1 * | 11/2006 | Itaba | H04W 8/245 |
| | | | | 455/414.3 |
| 2007/0088814 | A1 * | 4/2007 | Torii | H04L 41/0273 |
| | | | | 709/223 |
| 2007/0124459 | A1 * | 5/2007 | Kasama | G06F 8/61 |
| | | | | 709/224 |
| 2009/0144629 | A1 * | 6/2009 | Ferlitsch | H04L 67/04 |
| | | | | 715/736 |
| 2013/0019237 | A1 * | 1/2013 | Pardehpoosh | G06Q 30/0609 |
| | | | | 717/176 |
| 2014/0173069 | A1 * | 6/2014 | Kim | H04L 67/51 |
| | | | | 709/221 |
| 2016/0241532 | A1 * | 8/2016 | Loughlin-Mchugh | |
| | | | | H04W 12/068 |
| 2017/0147323 | A1 * | 5/2017 | Hu | G06F 8/658 |
| 2021/0385103 | A1 | 12/2021 | Hashimoto | |
| 2025/0054252 | A1 * | 2/2025 | Nam | G02B 27/017 |

FOREIGN PATENT DOCUMENTS

| | | | | | |
|---|---|---|---|---|---|
| JP | 2004-240915 | A | | 8/2004 | |
| JP | 2006-260027 | A | | 9/2006 | |
| JP | 2014-192675 | A | | 10/2014 | |
| JP | 2018-067352 | A | | 4/2018 | |
| TW | 464806 | B | * | 11/2001 | |
| WO | WO-2004107797 | A1 | * | 12/2004 | H04W 8/245 |
| WO | 2020/110312 | A1 | | 6/2020 | |

OTHER PUBLICATIONS

International Search Report issued on Dec. 21, 2021 in International Patent Application No. PCT/JP2021/037666, with English translation.

Japanese Office Action dated Dec. 26, 2023 issued in the corresponding Japanese Patent Application No. 2022-556989.

Chinese Office Action dated Dec. 17, 2025 issued in the corresponding Chinese Patent Application No. 202180070884.6, with English translation of the Search Report.

\* cited by examiner

FIG. 4

First step

Second step

Third step

Configure
registration
settings

Next

Register?

Register

INFORMATION PROCESSING DEVICE, INFORMATION PROCESSING SYSTEM, ELECTRONIC DEVICE, COMMUNICATION MODULE, INFORMATION PROCESSING METHOD, AND RECORDING MEDIUM

CROSS-REFERENCE OF RELATED APPLICATIONS

This application is the U.S. National Phase under 35 U.S.C. § 371 of International Patent Application No. PCT/JP2021/037666, filed on Oct. 12, 2021, which in turn claims the benefit of Japanese Patent Application No. 2020-176863, filed on Oct. 21, 2020, the entire disclosures of which Applications are incorporated by reference herein.

TECHNICAL FIELD

The present disclosure relates to an information processing device, an information processing system, an electronic device, a communication module, an information processing method, and a recording medium.

BACKGROUND ART

Patent Literature (PTL) 1 discloses a remote device management system in which a management device and a single or a plurality of electronic devices can communicate with each other via a communication device, and the electronic devices are remotely managed by the management device via the communication device.

CITATION LIST

Patent Literature

[PTL 1]
Japanese Unexamined Patent Application Publication No. 2018-67352

SUMMARY OF INVENTION

Technical Problem

The present disclosure provides, for example, an information processing device that allows users to easily execute procedures for registering an electronic device in a management system.

Solution to Problem

An information processing device according to the present disclosure includes a communicator and a processor. The communicator communicates with an electronic device including a communication module. The processor executes determination processing of determining an execution procedure for registering, via an access point, the electronic device with a management system that manages the electronic device. The determination processing includes first processing, second processing, and third processing. In the first processing, the communicator is caused to transmit, to the electronic device, a request signal requesting transmission of identification information of the electronic device and identification information of the communication module. In the second processing, a response signal responding to the request signal is received from the communication module via the communicator. In the third processing, the execution procedure is determined based on: whether the response signal has been received; and when the response signal has been received, the identification information of the electronic device and the identification information of the communication module, which are included in the response signal.

An information processing system according to the present disclosure includes the information processing device and the electronic device including the communication module that is capable of communicating with the information processing device.

An electronic device according to the present disclosure includes, in response to receiving the request signal from the information processing device via the communication module, the identification information of the electronic device itself in the response signal, and transmits the response signal back to the information processing device via the communication module.

A communication module according to the present disclosure includes, in response to receiving the request signal from the information processing device, the identification information of the communication module itself in the response signal, and transmits the response signal back to the information processing device.

An information processing method according to the present disclosure includes determination processing of determining an execution procedure for registering, via an access point, an electronic device including a communication module with a management system that manages the electronic device. The determination processing includes: first processing, second processing, and third processing. In the first processing, a request signal requesting transmission of identification information of the electronic device and identification information of the communication module is transmitted to the electronic device. In the second processing, a response signal responding to the request signal is received from the communication module. In the third processing, the execution procedure is determined based on: whether the response signal has been received; and when the response signal has been received, the identification information of the electronic device and the identification information of the communication module, which are included in the response signal.

A recording medium according to the present disclosure is a non-transitory computer-readable recording medium having a program recorded thereon for causing one or more processors to execute the information processing method.

Advantageous Effects of Invention

According to an information processing device of the present disclosure, a user can easily execute procedures for registering an electronic device with a management system.

BRIEF DESCRIPTION OF DRAWINGS

FIG. 4 is an explanatory diagram showing an example of a registration procedure according to the embodiment.

Figure 1:
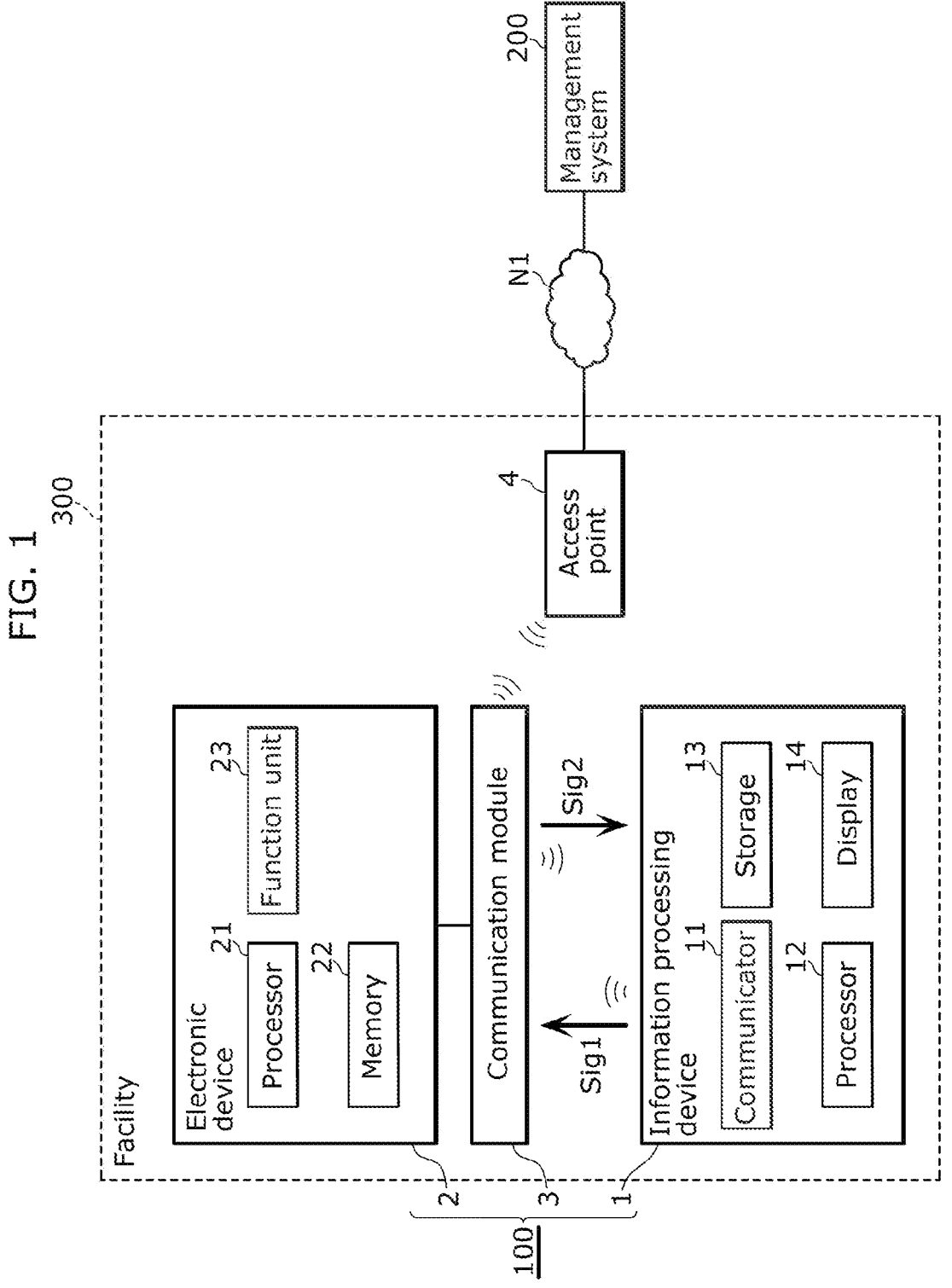
FIG. 1 is a block diagram showing an overall structure including an information processing device according to an embodiment.

DESCRIPTION OF EMBODIMENTS (Underlying Knowledge Forming Basis of the Present Disclosure)

First, inventors' viewpoints are described below.

It has been conventionally known that a user executes execution procedures using an information processing device such as a smartphone owned by the user, to thereby register an electronic device such as a home appliance with a management system. The management system manages electronic devices, and is, for example, a server or the like operated by a trader who sells the electronic devices or a trader who manages the electronic devices. According to the execution procedure, an electronic device including a communication module is registered with a management system via an access point installed in a facility (for example, a house). Here, the access point is, for example, a wireless local area network (LAN) router and has a router function of connecting to external network N1 such as the Internet.

For example, a user executes the execution procedure by operating an accessory device such as a remote controller attached to the electronic device to be registered, an information processing device, and so on, in accordance with procedures displayed on a display of the information processing device.

If the electronic device is registered with the management system, a user can enjoy a service that allows the user to view information regarding the registered electronic device (for example, a usage status of the electronic device) on the information processing device. In addition, the user can enjoy a service that allows the user to remotely control the registered electronic device using the information processing device. Specifically, when a user uses the information processing device to input a command for the electronic device, the command is transmitted to the management system via an external network. The management system transmits the received command to a corresponding electronic device via the external network and access points. Then, the electronic device receives the command using a communication module, and performs an operation according to the received command.

Here, the execution procedure may vary depending on a type and specification of the electronic device, a version of a computer program that the electronic device has, and the like. Furthermore, the execution procedure may vary depending on a type and specification of the communication module of the electronic device, a version of a computer program that the communication module has, and the like, in addition to those of the electronic device. In other words, various execution procedures can be provided depending on a combination of the electronic device and the communication module.

For example, if versions of the electronic device and the communication module are old, the electronic device possibly cannot be registered with the management system unless a user executes an execution procedure that includes a large number (for example, nine) of steps to be executed. On the other hand, newer versions of the electronic device and the communication module refine and simplify the execution procedures. As a result, the electronic device may be registered with the management system merely by a user executing an execution procedure that includes a small number (for example, three) of procedures to be executed.

Conventionally, execution procedures in an application of the information processing device are fixed. If the corresponding execution procedures of the electronic device and the communication module are different, it has been necessary to use another application. This requires a user to select the corresponding application, and it has been difficult to execute the procedure (execution procedure) for registering the electronic device with the management system.

In view of the above, the inventors have come to create the present disclosure.

Hereinafter, embodiments are specifically described, with reference to the drawings appropriately. However, more detailed description than necessary may be omitted. For example, a detailed description of a well-known matter and a redundant description of substantially the same configurations may be omitted. This is to avoid unnecessary redundancy in the following description and to facilitate understanding by those skilled in the art.

It should be noted that the inventors provide the accompanying drawings and the following description for full understanding of the present disclosure by those skilled in the art, and do not intend to limit the claimed subject matter thereby.

Embodiments

[1-1. Overall Structure]

First, an overall configuration including information processing system 100 provided with information processing device 1 is described. FIG. 1 is a block diagram showing an overall configuration including information processing system 100 according to an embodiment. Information processing system 100 includes information processing device 1 and electronic device 2 including communication module 3. Although one electronic device 2 is provided in the embodiment, a plurality of electronic devices 2 may be provided. Electronic device 2 is installed in facility 300 such as a house, for example. In the embodiment, it is assumed that the facility 300 is a house and a user of information processing device 1 is a resident. Facility 300 is not limited to a house, and may be a residential facility including an apartment complex, an educational facility including an elementary school, a junior high school, a high school, and a university, a public facility including a community center and a library, a store, or a commercial facility.

Access point 4 is installed in facility 300, in addition to electronic device 2. Although access point 4 is not included in information processing system 100 in the embodiment, it may be included therein. At a remote location away from facility 300, management system 200 is installed which can communicate with access point 4 via external network N1 such as the Internet. In the embodiment, management system 200 is not included in information processing system 100, but may be included therein.

Management system 200 is, for example, a server operated by a trader who sells electronic device 2 or a trader who manages electronic device 2, and provides various services regarding registered electronic device 2 to a user of information processing device 1. As already described, the service includes, for example, browse of information about registered electronic device 2, remote control of registered electronic device 2, and the like. Although management system 200 manages electronic device 2 installed in one facility 300 in the embodiment, management system 200 may manage electronic devices 2 respectively installed in a plurality of facilities 300.

Information processing device 1 is a mobile terminal owned by a user, such as a smartphone and a tablet terminal. In the embodiment, it is assumed that information processing device 1 is a smartphone. Information processing device 1 is described in detail in paragraphs of [1-2. information processing device], later.

Electronic device 2 is, for example, a home appliance, such as an air conditioner, an air purifier, a washing machine, a television receiver, an automatic vacuum cleaner, a recording device, a refrigerator, and a cooking device including a microwave oven. It should be noted that electronic device 2 may be a lighting device, or a device other than home appliances. In the embodiment, it is assumed that electronic device 2 is an air conditioner.

Electronic device 2 includes processor 21 and memory 22. Electronic device 2 also includes function unit 23 that exerts a unique function for each electronic device 2 under the control of processor 21. In the embodiment, electronic device 2 is an air conditioner, so that function unit 23 exerts the air conditioning function under the control of processor 21.

In the embodiment, communication module 3 is incorporated in electronic device 2, but is a device independent of electronic device 2, and includes a processor different from processor 21 of electronic device 2 and a memory different from memory 22 of electronic device 2. The memory stores identification information (described later) of communication module 3. Furthermore, communication module 3 is connected to electronic device 2 by, for example, a universal asynchronous receiver/transmitter (UART) or the like, and is configured to be capable of communicating with electronic device 2. In addition, electronic device 2 and communication module 3 are independent devices different from each other. Accordingly, the identification information of electronic device 2 is information specific to electronic device 2, the identification information of communication module 3 is information specific to communication module 3, as described later.

Communication module 3 can communicate with information processing device 1. In the embodiment, communication module 3 has a software access point function, and can wirelessly communicate with information processing device 1 by using the function. An example of communication standards for communication between communication module 3 and information processing device 1 includes WiFi (registered trademark) and Bluetooth (registered trademark) low energy (BLE), but may not be limited to these communication standards.

In addition, functions executed by communication module 3 may include a response function. It should be noted that not all communication modules 3 can execute the response function, and some communication modules 3 cannot execute the response function.

In the response function, when receiving request signal Sig1 (described later) from information processing device 1, communication module 3 requests identification information of electronic device 2 from electronic device 2, so as to obtain the identification information of electronic device 2, and to read identification information of communication module 3 from the memory. Then, communication module 3 transmits a response signal including the obtained identification information of electronic device 2 and the read identification information of communication module 3, back to information processing device 1.

Here, the identification information of electronic device 2 can include a unique communication identifier assigned to electronic device 2, a product number of electronic device 2, and version information regarding the version of a computer program that electronic device 2 has. The identification information of communication module 3 can include a unique communication identifier assigned to communication module 3, a product number of communication module 3, and version information regarding the version of a computer program that communication module 3 has.

Furthermore, communication module 3 is configured to be capable of communicating with access point 4 by following a connection procedure described later. A communication standard for the communication between communication module 3 and access point 4 is, for example, WiFi (registered trademark), but is not limited to this communication standard.

Electronic device 2 exchanges information with information processing device 1 through communication between communication module 3 and information processing device 1. Electronic device 2 exchanges information with management system 200 via access point 4 through communication between communication module 3 and access point 4.

Processor 21 executes a computer program stored in memory 22, to thereby implement various functions of electronic device 2, such as control of function unit 23.

Memory 22 is a storage device that stores information (computer programs, etc.) necessary for processor 21 to perform control. Memory 22 is embodied by, for example, a semiconductor memory, but can be embodied by using known electronic information storage means without particular limitation. Identification information of electronic device 2 is stored in memory 22.

Access point 4 is a wireless LAN router having a router function. It should be noted that access point 4 may not have a router function, and may communicate with management system 200 via a router installed separately from access point 4. Access point 4 may be connected to external network N1 by wired communication using, for example, an optical line. In addition, access point 4 may be connected to external network N1 by wireless communication using, for example, 4th Generation (4G) or 5th Generation (5G).

[1-2. Information Processing Device]

Next, information processing device 1 is described in detail. Information processing device 1 includes communicator 11, processor 12, and storage 13, as shown in FIG. 1. Information processing device 1 further includes display 14 configured by, for example, a liquid crystal panel or an organic electro-luminescence (EL) panel. Display 14 is a touch panel and also serves as an interface for accepting an operation input by a user.

Communicator 11 communicates with electronic device 2 including communication module 3. For example, communicator 11 communicates with communication module 3 in accordance with the wireless communication standard such as WiFi (registered trademark) or Bluetooth (registered trademark) low energy (BLE), as already described, so as to communicate with electronic device 2. Further, communicator 11 can communicate with access point 4 by inputting and setting, in information processing device 1, authentication information possessed by access point 4. The authentication information is a service set identifier (SSID) and a password (encryption key) of access point 4.

Processor 12 implements various functions of information processing device 1 by executing computer programs stored in storage 13. As one of the processing that processor 12 can execute, processor 12 executes determination processing ST1. In determination processing ST1, an implementation procedure is determined for registering, via access point 4, electronic device 2 with management system 200 that manages electronic device 2. Determination processing ST1 is started when a user performs input of a specific operation on information processing device 1, for example.

The input of specific operation may include, for example, execution of a dedicated or a general-purpose application installed in information processing device 1. The application is executed by a user selecting an icon corresponding to the application displayed on display 14 of information processing device 1, for example. Furthermore, the input of specific operation may include, for example, performing a predetermined operation during execution of an application. The predetermined operation is, for example, selecting an icon or the like displayed on display 14 of information processing device 1 during execution of an application.

The execution procedure may include a procedure executed by information processing device 1 using processor 12, and may also include a procedure executed by a user such as input to information processing device 1. The execution procedure may include only one procedure or may include multiple procedures. In the embodiment, various execution procedures can be provided depending on a combination of electronic device 2 and communication module 3.

Specifically, the execution procedure may include a procedure in which a user performs the input of specific operation on information processing device 1, or a procedure in which a user performs the input of specific operation, using accessory device 5 (see FIG. 3) such as a remote controller attached to electronic device 2. The execution procedure may also include, for example, a procedure in which a user checks a state of electronic device 2 (for example, a lighting state of lamp 24 (see FIG. 2) attached to electronic device 2). Here, the input of specific operation, which is performed in information processing device 1 may include, for example, selection of an icon displayed on display 14 or input of a character string in a field displayed on display 14. The input of specific operation, which is performed in accessory device 5 may include, for example, operation of a switch such as a button provided in accessory device 5, or continuation of the operation of the switch for a predetermined period of time.

Here, when two execution procedures are compared, these execution procedures may be different. However, the difference is not limited to a difference in types of the procedures included in each of the two execution procedures. For example, when two execution procedures are compared, the types of procedures included in each of the two execution procedures may be the same. Even in such a situation, if at least one or more procedures have different parameters, these execution procedures are mutually exclusive. The parameters may include, for example, a time period during which the switch is continuously pressed in accessory device 5, a character string to be input in information processing device 1, or the like.

In the embodiment, the execution procedure includes a connection procedure and a registration procedure. The connection procedure is a procedure for connecting electronic device 2 to access point 4. The registration procedure is a procedure for registering electronic device 2 with management system 200 via access point 4 after executing the connection procedure. In other words, the registration of electronic device 2 with management system 200 first requires connection of electronic device 2 to access point 4. With this connection, electronic device 2 is connected to external network N1 via access point 4. Thereafter, electronic device 2 is registered with management system 200 via access point 4 (i.e., external network N1).

Figure 2:
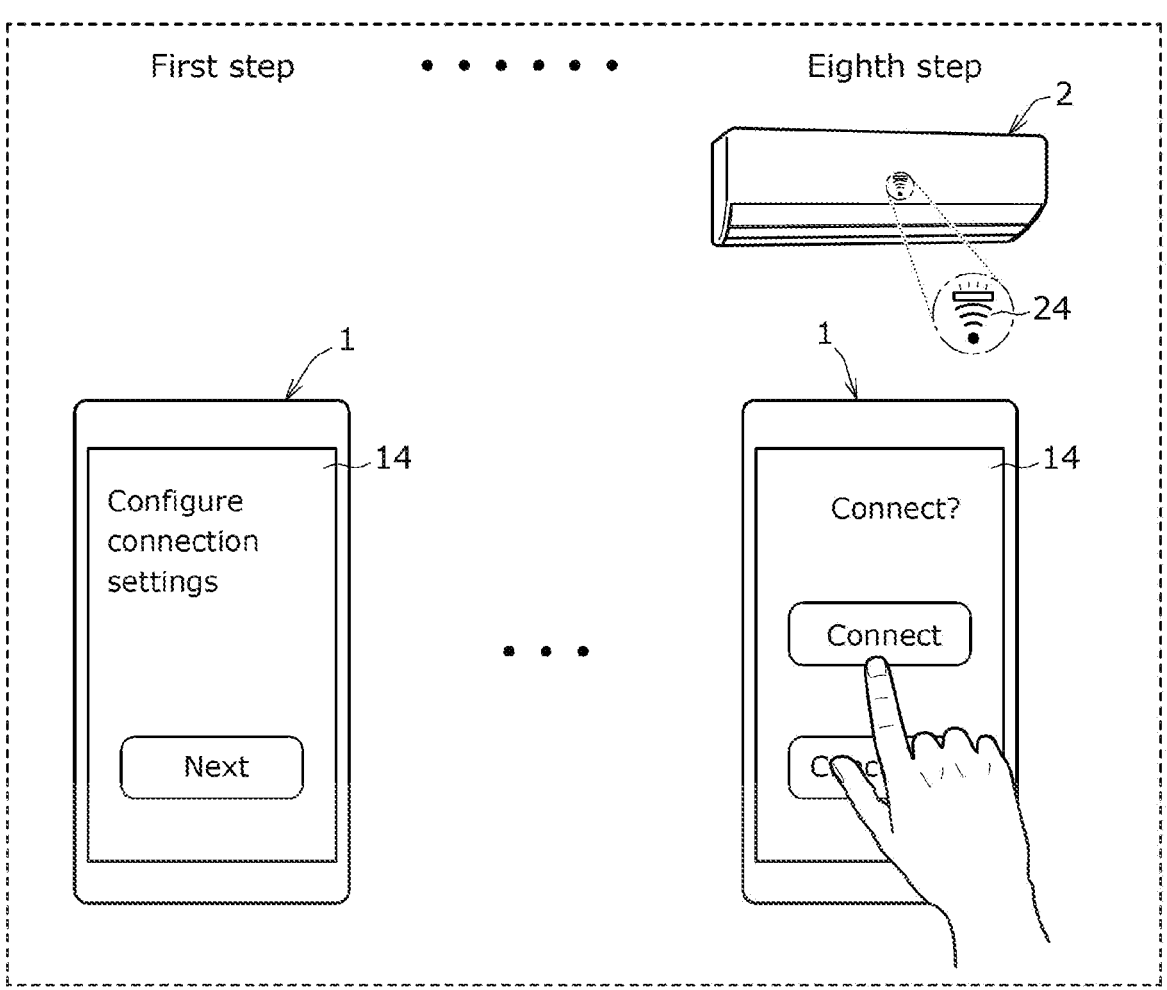
FIG. 2 is an explanatory diagram showing an example of a connection procedure according to the embodiment.
Figure 3:
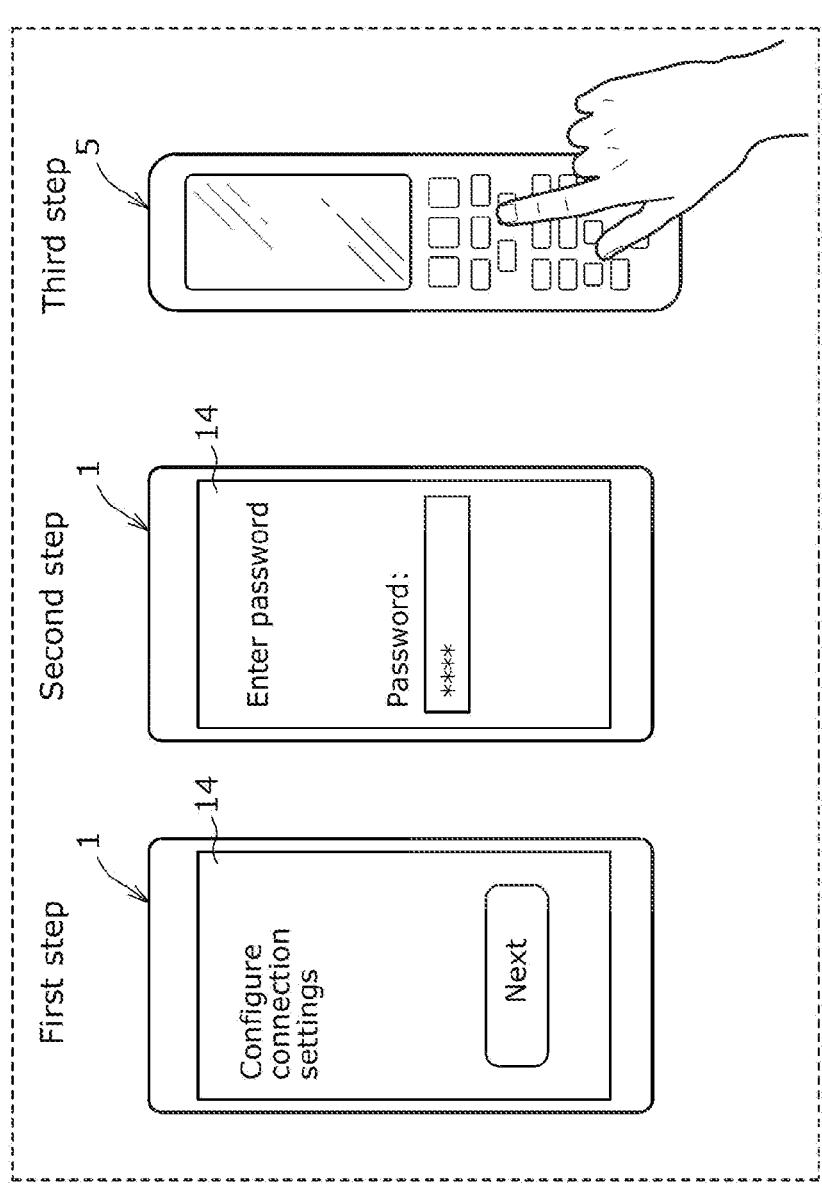
FIG. 3 is an explanatory diagram showing another example of the connection procedure according to the embodiment.
Figure 4:
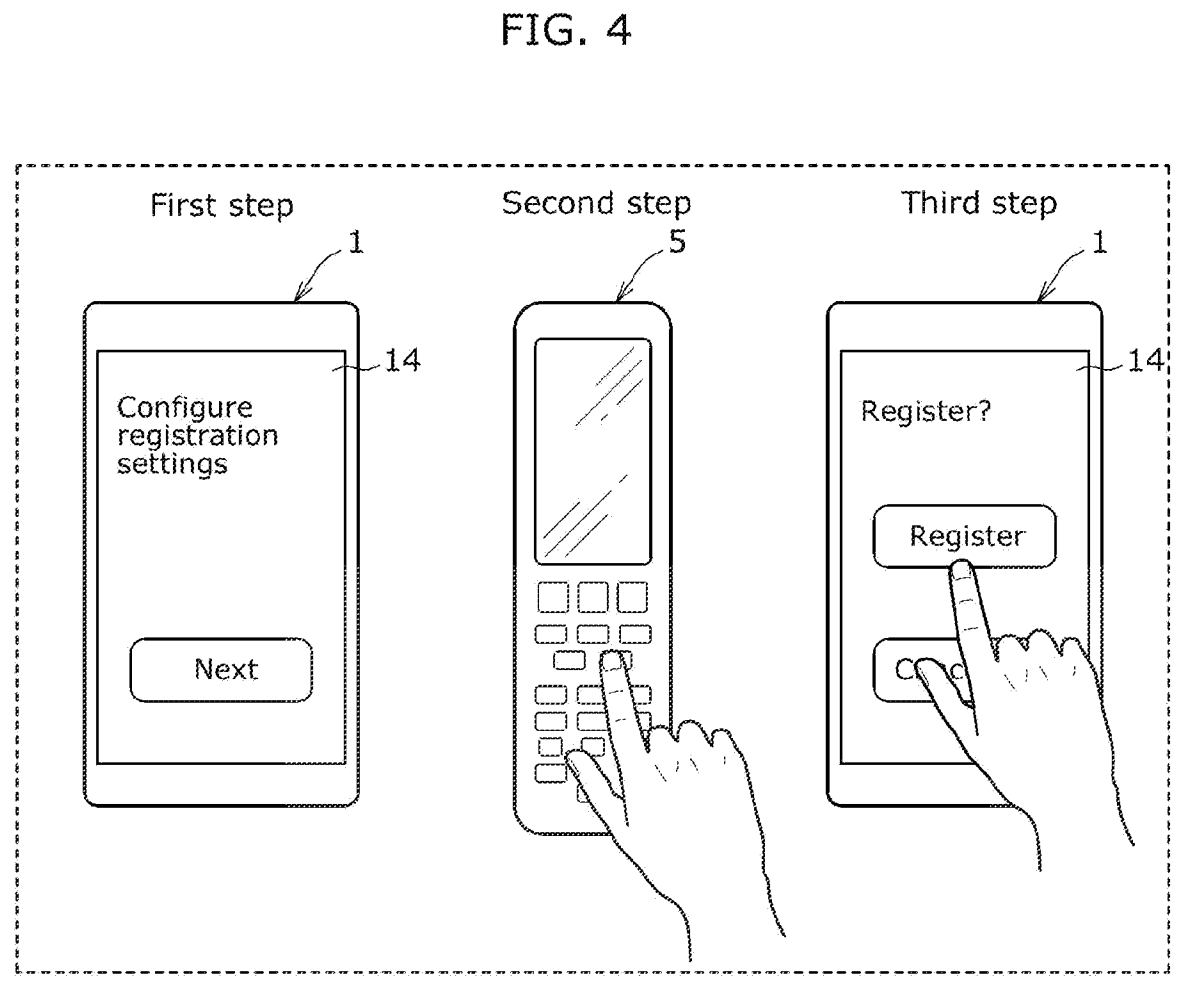

Examples of the execution procedure are listed. FIG. 2 is an explanatory diagram showing an example of the connection procedure in the embodiment. FIG. 3 is an explanatory diagram showing another example of the connection procedure in the embodiment. FIG. 4 is an explanatory diagram showing an example of the registration procedure in the embodiment. In the examples shown in FIGS. 2 to 4, only the procedures to be executed by a user are shown, and procedures to be executed by processor 12 among the execution procedures are not shown. In the below description, a procedure to be executed by a user among the execution procedures is referred to as a "step".

In the example shown in FIG. 2, the connection procedure includes a total of eight steps in addition to the procedure executed by processor 12. In the first step, a user executes an application installed in information processing device 1, so as to activate a setting screen of WiFi (registered trademark). In the second to seventh steps, a user operates accessory device 5, checks the state of electronic device 2 (here, the lighting state of lamp 24 provided in electronic device 2), inputs an authentication information in information processing device 1, and executes such various procedures. The status of electronic device 2 includes a status of whether the connection of electronic device 2 to access point 4 is permitted. Then, in the eighth step, after checking the state of electronic device 2, a user performs input for connecting electronic device 2 to access point 4, in information processing device 1.

In the example shown in FIG. 3, the connection procedure includes a total of three steps in addition to the procedures executed by processor 12. In the first step, a user executes an application installed in information processing device 1 so as to activate the setting screen of WiFi (registered trademark). In the second step, the user inputs the authentication information of access point 4 in information processing device 1. Then, in the third step, the user operates a specific switch attached to accessory device 5.

In the example shown in FIG. 4, the registration procedure includes a total of three steps in addition to the procedure executed by processor 12. In the first step, a user activates the registration screen for registering electronic device 2 through an application that is executing in information processing device 1. In the second step, the user operates a specific switch attached to accessory device 5. This switch may be the same as or different from the switch operated in the connection procedure shown in FIG. 3. Then, in the third step, the user inputs information necessary for registering electronic device 2, in information processing device 1. FIG. 4 illustrates a procedure in which the user selects a "register" icon in information processing device 1 after inputting the above information, in the third step.

In the example shown in FIG. 2, a user performs a total of eight steps, thereby allowing electronic device 2 to be connected to access point 4, as described above. On the other hand, in the example shown in FIG. 3, electronic device 2 is connected to access point 4 by a user executing a total of three steps only. Depending on a combination of electronic device 2 and communication module 3, the connection procedure shown in FIG. 2 may be included in the execution procedure, and the connection procedure shown in FIG. 3 may be included in the execution procedure. Furthermore, depending on a combination of electronic device 2 and communication module 3, a connection procedure other than the connection procedures shown in FIGS. 2 and 3 may be included in the execution procedure. For example, the connection procedure may include a total of six steps in addition to the procedures executed by processor 12. The connection procedure in this case can be configured, for example, by omitting two steps among the eight steps included in the connection procedure shown in FIG. 2.

Further, in the example shown in FIG. 4, electronic device 2 is registered with management system 200 by a user executing a total of three steps, as described above. Depending on a combination of electronic device 2 and communication module 3, the execution procedure may include the registration procedure shown in FIG. 4, or the execution procedure may include a registration procedure other than the registration procedure shown in FIG. 4. For example, the registration procedure may include a total of two steps in addition to the procedure executed by processor 12. The registration procedure in this case can be configured, for example, by omitting the second step of the three steps included in the registration procedure shown in FIG. 4.

Hereinafter, determination processing ST1 executed by processor 12 is described in detail. Determination processing ST1 includes first processing ST11, second processing ST12, and third processing ST13.

In first processing ST11, communicator 11 is caused to transmit, to electronic device 2, request signal Sig1 for requesting transmission of the identification information of electronic device 2 and the identification information of communication module 3. Request signal Sig1 includes a command of requesting the identification information of electronic device 2 and the identification information of communication module 3, and an address of information processing device 1 as a transmission source. In first processing ST11, processor 12 causes communicator 11 to broadcast request signal Sig1, for example.

In second processing ST12, response signal Sig2 responding to request signal Sig1 is received from communication module 3 via communicator 11. In second processing ST12 of the embodiment, processor 12 causes communicator 11 to wait for response signal Sig2 for a predetermined period of time from the time when request signal Sig1 is transmitted.

In third processing ST13, the execution procedure is determined based on whether response signal Sig2 has been received, and on the identification information of electronic device 2 and the identification information of communication module 3 which are included in response signal Sig2 when response signal Sig2 has been received. In third processing ST13 of the embodiment, when response signal Sig2 is received, database is searched using the identification information of electronic device 2 and the identification information of communication module 3, which are included in response signal Sig2, so as to select and determine one execution procedure from a plurality of execution procedures specified in advance. In the execution procedure determined in third processing ST13, electronic device 2 can be registered with management system 200. The database stores a plurality of sets of the identification information of electronic device 2, the identification information of communication module 3, and the corresponding execution procedures. In the embodiment, the database is stored in storage 13 of information processing device 1.

Further, in the embodiment, when response signal Sig2 cannot be received in second processing ST12, a default procedure is determined as the execution procedure, in third process ST13, regardless of the identification information of electronic device 2 and the identification information of communication module 3. The default procedure is an execution procedure defined in advance separately from the execution procedure associated with the identification information of electronic device 2 and the identification information of communication module 3 described above, and is stored in the database.

Further, in the embodiment, processor 12 executes presentation process ST2 after executing determination processing ST1. In presentation processing ST2, the execution procedure determined in determination processing ST1 is presented to a user of information processing device 1. In presentation processing ST2 according to the embodiment, the execution procedure is presented to a user by displaying the execution procedure on display 14 of information processing device 1 using a character string, an image, or the like. It should be noted that presentation of the execution procedure to a user is not limited to the display on display 14. For example, in presentation processing ST2, the execution procedure may be presented to a user by outputting the execution procedure with sound through a speaker of information processing device 1. Further, in presentation processing ST2, the execution procedure may be presented to a user by combining the display on display 14 and the output of sound from a speaker.

[2. Operation]

Figure 5:
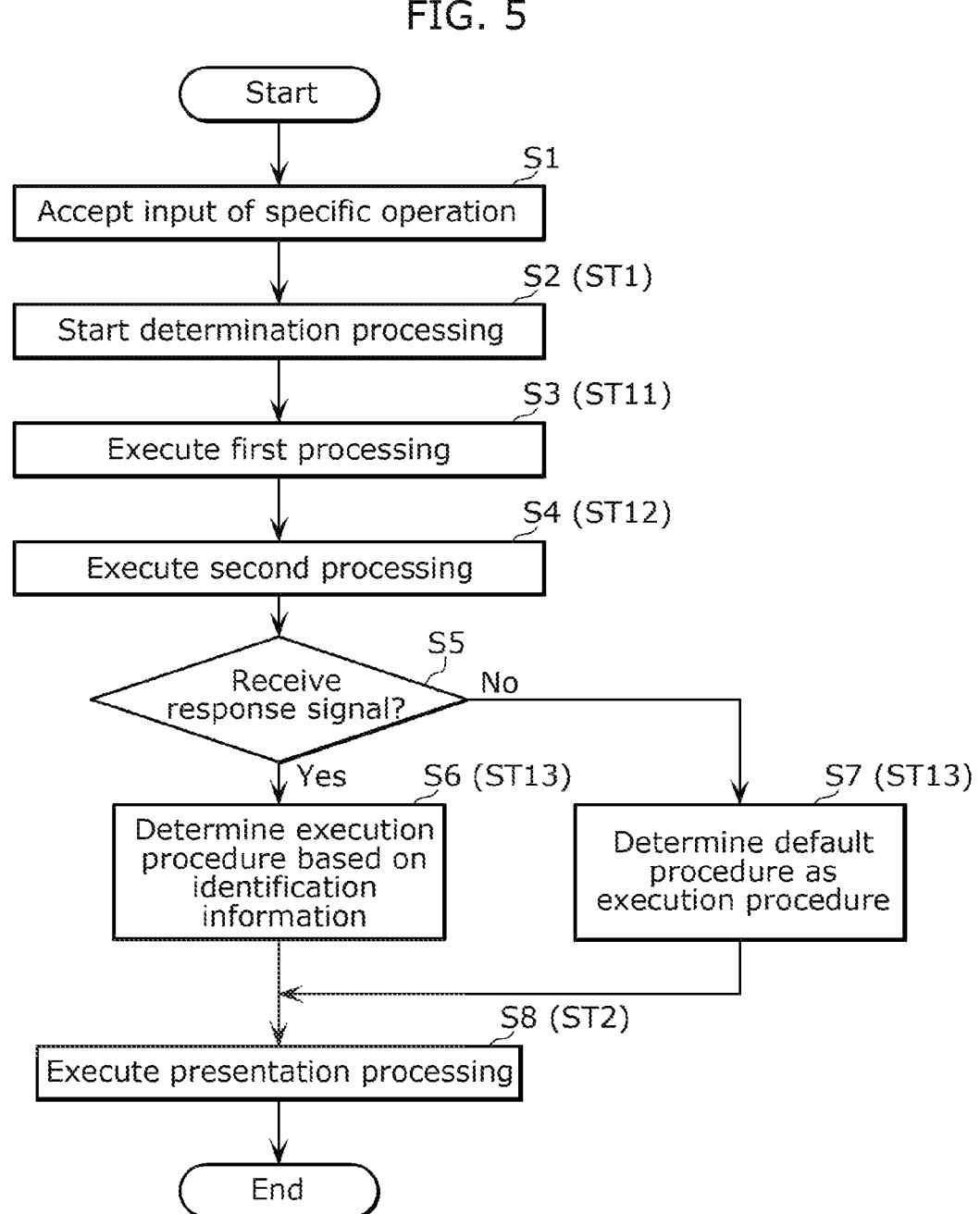
FIG. 5 is a flowchart showing an example of an operation of the information processing device according to the embodiment.

Operation of information processing device 1 configured as above is described hereinafter with reference to FIG. 5. FIG. 5 is a flowchart showing an example of the operation of the information processing device according to the embodiment. In the following description, it is assumed that communicator 11 of information processing device 1 can communicate with electronic device 2 to be registered, by a software access point function of communication module 3. Here, electronic device 2 to be registered refers to electronic device 2 that a user of information processing device 1 wants to register with management system 200. It should be noted that processing for enabling communication between communicator 11 and electronic device 2 to be registered may be included in determination processing ST1.

First, processor 12 of information processing device 1 accepts the input of specific operation from a user (Step S1), and starts determination processing ST1 (Step S2). When determination processing ST1 is started, processor 12 first executes first processing ST11 (Step S3). In first processing ST11, processor 12 causes communicator 11 to transmit request signal Sig1 to electronic device 2 to be registered. If the identification information of electronic device 2 and the identification information of communication module 3 are present, communication module 3 of electronic device 2 to be registered transmits, upon receiving request signal Sig1, response signal Sig2 including each identification information back to information processing device 1. On the other hand, if the identification information is not present or communication module 3 included in electronic device 2 to be registered cannot respond to the command included in request signal Sigh received, communication module 3 does not perform anything in particular.

Next, processor 12 executes second processing ST12 (Step S4). In second processing ST12, processor 12 waits, for a predetermined period of time, for response signal Sig2 from communication module 3 of electronic device 2 to be registered. Communicator 11 may receive response signal Sig2 during the predetermined period of time (Yes in Step S5), and communicator 11 may fail to receive response signal Sig2 during the predetermined period of time (No in Step S5). In either case, processor 12 starts executing third processing ST13 (Steps S6 and S7). It should be noted that third processing ST13 in processing S6 and third processing ST13 in processing S7 are different in processing content.

If communicator 11 receives response signal Sig2 in second processing ST12 (Yes in Step S5), processor 12 determines the execution procedure based on the identification information of electronic device 2 and the identification information of communication module 3, which are included in response signal Sig2 (Step S6). On the other hand, if communicator 11 fails to receive response signal Sig2 in second processing ST12 (No in Step S5), processor 12 determines, as the execution procedure, a default procedure that does not depend on the identification information of electronic device 2 and the identification information of communication module 3 (Step S7). This execution procedure is preferably compatible with all electronic devices 2.

Thereafter, processor 12 executes presentation processing ST12 (Step S8). In presentation processing ST2, processor 12 presents the execution procedure determined in third processing ST13, to a user of information processing device 1. In the embodiment, processor 12 causes display 14 of information processing device 1 to display a character string, an image, or the like, so as to present, to a user, the execution procedure determined in third processing ST13. Accordingly, the user follows the execution procedure while looking at display 14 of information processing device 1, so as to be capable of registering electronic device 2 with management system 200. If the execution procedure includes a plurality of procedures, processor 12 sequentially presents the procedures each time a user completes the procedure.

[3. Effects Etc.]

Hereinafter, advantages of information processing device 1 according to the embodiment are described.

As already described, the execution procedures in an application of the conventional information processing device are fixed. Accordingly, if the corresponding execution procedures of electronic device 2 and communication module 3 are different, it has been necessary to use another application. Therefore, it is necessary for a user to select the corresponding application, and thus it is unfortunately difficult for the user to execute the procedure for registering electronic device 2 with management system 200.

On the other hand, in information processing device 1 according to the embodiment, an execution procedure suitable for electronic device 2 to be registered can be determined from among various execution procedures based on the identification information of electronic device 2 and the identification information of communication module 3. Therefore, in information processing device 1 according to the embodiment, a user can complete procedures for registering electronic device 2 with management system 200 merely by using one application on information processing device 1 without selecting the corresponding application. In other words, in information processing device 1 according to the embodiment, there is an advantage that a user can easily execute the procedure for registering electronic device 2 with management system 200.

(Variation)

As described above, the embodiment has been described as an example of the technology to be described in the present application. However, the technology in the present disclosure is not limited thereto, and can be applied to embodiments in which modifications, replacements, additions, omissions, and the like are made as appropriate. Further, it is also possible to combine the components described in the above embodiments to form a new embodiment.

Thus, variations of embodiments are exemplified below.

In third processing ST13 according to the embodiment, when determining the execution procedure, a database of information processing device 1 may be referred to, or a database of a device other than information processing device 1 may be referred to (for example, management system 200). In the latter case, information processing device 1 transmits the obtained identification information to another device and receives an execution procedure according to the identification information.

The execution procedure is determined by searching the database using the identification information of electronic device 2 and the identification information of communication module 3 in third processing ST13 according to the embodiment, but is not limited thereto. For example, the execution procedure may be determined in third processing ST13, using a fixed algorithm with two variables that are the identification information of electronic device 2 and the identification information of communication module 3. In this case, no database is required for the processing of determining the execution procedure.

Information processing device 1 is connected to access point 4 in the embodiment, but is not limited thereto. For example, information processing device 1 can determine the execution procedure, even if information processing device 1 is not connected to access point 4.

In the embodiment, processor 12 presents, to a user, the execution procedure determined in determination processing ST1 through presentation processing ST2, but is not limited thereto. For example, processor 12 may execute the execution procedure determined in determination processing ST1, instead of executing presentation processing ST2. In other words, processor 12 may automatically execute the execution procedure determined in determination processing ST1 without relying on a user's hand. Furthermore, processor 12 may, for example, automatically execute the execution procedure after presenting the execution procedure determined in determination processing ST1 to a user of information processing device 1 in presentation processing ST2.

In the embodiment, electronic device 2 may be distributed in the market as a single unit rather than as one component of information processing system 100. In other words, in response to receiving request signal Sig1 from information processing device 1 via communication module 3, electronic device 2 includes its own identification information in response signal Sig2 and then transmits the signal back to information processing device 1 via communication module 3.

Further, communication module 3 can be distributed in the market as a single unit rather than as one component of electronic device 2, in the embodiment. In other words, in response to receiving request signal Sig1 from information processing device 1, communication module 3 includes its own identification information in response signal Sig2 and then transmits the signal back to information processing device 1.

For example, all or a part of the components of processor 12 included in information processing device 1 of the present disclosure may be configured by dedicated hardware, or may be embodied by executing software programs respectively suitable for the components, in the above embodiment. Each of the components may be embodied in a manner that a program executer, such as a central processing unit (CPU) or a processor, reads a software program recorded in a recording medium, such as a hard disk drive (HDD) or a semiconductor memory, to execute the program.

In addition, components of processor 12 included in information processing device 1 according to the present disclosure may be configured by a single or a plurality of electronic circuits. The single or each of the plurality of electronic circuits may be a general-purpose circuit or a dedicated circuit.

The single or the plurality of electronic circuits may include, for example, a semiconductor device, an integrated circuit (IC), or large scale integration (LSI). The IC or the LSI may be integrated on a single chip or may be integrated on a plurality of chips. Although the IC or the LSI is referred to here, the way of calling is changed depending on the degree of integration and these may be called system LSI, very large scale integration (VLSI), or ultra large scale integration (ULSI). A field programmable gate array (FPGA) programmed after the LSI is manufactured can also be used for the same purpose.

Furthermore, general or specific aspects of the disclosure may be embodied by a system, a device, a method, an integrated circuit, or a computer program. Alternatively, they may be embodied by a computer-readable non-temporary recording medium, such as an optical disc, HDD, or semiconductor memory, which store the computer program. For example, the present disclosure may be embodied as a program for causing a computer to execute the information processing method according to the embodiments described above. Furthermore, this program may be recorded in a non-temporary recording medium, such as a computer-readable CD-ROM, or may be distributed through a communication channel, such as the Internet.

As described above, the embodiments have been described as an example of the technology in the present disclosure. For the description, the accompanying drawings and detailed description have been provided.

Among the components described in the accompanying drawings and detailed description, components that are not essential for solving the problem are included in addition to components that are essential for solving the problem, in order to exemplify the above technology. Therefore, it should not be immediately recognized that those non-essential components are essential just because they are described in the accompanying drawings and detailed description.

In addition, the above-described embodiments are intended to illustrate the technology of the present disclosure, and various changes, replacements, additions, omissions, or the like can be made within the scope of claims or equivalents thereof.

SUMMARY

As described above, information processing device 1 according to the embodiment includes communicator 11 and processor 12. Communicator 11 communicates with electronic device 2 including communication module 3. Processor 12 determines an execution procedure for registering, via access point 4, electronic device 2 with management system 200 that manages electronic device 2. Determination processing ST1 includes first processing ST11, second processing ST12, and third processing ST13. In first processing ST11, communicator 11 is caused to transmit, to electronic device 2, request signal Sig1 for requesting transmission of the identification information of electronic device 2 and the identification information of communication module 3. In second processing ST12, response signal Sig2 responding to request signal Sig1 is received from communication module 3 via communicator 11. In third processing ST13, the execution procedure is determined based on whether response signal Sig2 has been received, and on the identification information of electronic device 2 and the identification information of communication module 3 which are included in response signal Sig2 when response signal Sig2 has been received.

According to the above configuration, it is possible to determine which execution procedure should be executed from among various execution procedures depending on a combination of electronic device 2 and communication module 3, thereby allowing a user to execute the procedure easier.

For example, if response signal Sig2 cannot be received in second processing ST12, a default procedure is determined as the execution procedure in third processing ST13, regardless of the identification information of electronic device 2 and the identification information of communication module 3.

According to the configuration, it is easy to determine an appropriate execution procedure for electronic device 2 to be registered, according to whether response signal Sig2 has been received.

For example, processor 12 further executes presentation processing ST2 for presenting the determined execution procedure to a user of information processing device 1.

According to the configuration, a user of information processing device 1 can execute the execution procedure while confirming the presented execution procedure, thereby allowing the user to easily execute the procedure for registering electronic device 2 with management system 200.

For example, processor 12 may execute the execution procedure determined in determination processing ST1.

According to the configuration, a user of information processing device 1 does not have to execute the execution procedure by himself/herself, thereby improving user's convenience.

Further, information processing system 100 according to the embodiment includes information processing device 1 and electronic device 2 including communication module 3 that can communicate with information processing device 1.

According to the configuration, it is possible to determine which execution procedure should be executed from among various execution procedures depending on a combination of electronic device 2 and communication module 3, thereby allowing a user to easily execute the procedure for registering electronic device 2 with management system 200.

Furthermore, in response to receiving request signal Sig1 from information processing device 1 via communication module 3, electronic device 2 according to the embodiment includes its own identification information in response signal Sig2 and transmits the signal back to information processing device 1 via communication module 3.

According to the above configuration, it is possible to determine which execution procedure should be executed from among various execution procedures depending on a combination of electronic device 2 and communication module 3, thereby allowing a user to easily execute the procedure for registering electronic device 2 with management system 200.

In response to receiving request signal Sig1 from information processing device 1, communication module 3 according to the embodiment includes its own identification information in response signal Sig2 and then transmits the signal back to information processing device 1.

According to the configuration, it is possible to determine which execution procedure should be executed from among various execution procedures depending on a combination of electronic device 2 and communication module 3, thereby allowing a user to easily execute the procedure for registering electronic device 2 with management system 200.

An information processing method according to the embodiment includes determination processing ST1 for determining an execution procedure of registering, via access point 4, electronic device 2 including communication module 3 with management system 200 that manages electronic device 2. Determination processing ST1 includes first processing ST11, second processing ST12, and third processing ST13. In first processing ST11, request signal Sigh for requesting transmission of the identification information of electronic device 2 and the identification information of communication module 3 is transmitted to electronic device 2. In second processing ST12, response signal Sig2 responding to request signal Sig1 is received from communication module 3. In third processing ST13, the execution procedure is determined based on whether response signal Sig2 has been received, and on the identification information of electronic device 2 and the identification information of communication module 3 which are included in response signal Sig2 when response signal Sig2 has been received.

According to the above configuration, it is possible to determine which execution procedure should be executed from among various execution procedures depending on a combination of electronic device 2 and communication module 3, thereby allowing a user to easily execute the procedure for registering electronic device 2 with management system 200.

Furthermore, a recording medium according to the embodiment is a non-transitory computer-readable recording medium having a program recorded thereon for causing one or more processors to execute the information processing method described above.

According to the configuration, it is possible to determine which execution procedure should be executed from among various execution procedures depending on a combination of electronic device 2 and communication module 3, thereby allowing a user to easily execute the procedure for registering electronic device 2 with management system 200.

INDUSTRIAL APPLICABILITY

The present disclosure is applicable to, for example, an information processing device to be used for registering an electronic device including a communication module with a management system that manages the electronic device.

The invention claimed is:

1. An information processing device comprising:
a communicator that communicates with an electronic device including a communication module; and
a processor that executes determination processing of determining a registration procedure for registering, via an access point, the electronic device with a management system that manages the electronic device, the registration procedure being executed by using one application not depending on identification information of the electronic device and a type of version information of the communication module, wherein
the determination processing includes:
first processing of causing the communicator to transmit, to the electronic device, a request signal requesting transmission of the identification information of the electronic device and the version information of the communication module;
second processing of receiving a response signal responding to the request signal from the communication module via the communicator; and
third processing of (i) determining, when the response signal has been received, the registration procedure based on the identification information of the electronic device and the version information of the communication module, which are included in the response signal and (ii) determining, when the response signal has not been received, a default procedure as the registration procedure regardless of the identification information of the electronic device and the version information of the communication module.

2. The information processing device according to claim 1, wherein
the processor further executes presentation processing of presenting the registration procedure determined, to a user of the information processing device.

3. The information processing device according to claim 1, wherein
the processor executes the registration procedure determined in the determination processing.

4. An information processing system comprising:
the information processing device according to claim 1; and
the electronic device including the communication module that is capable of communicating with the information processing device.

5. The information processing device according to claim 1, wherein
the identification information of the electronic device comprises information specific to the electronic device.

6. The information processing device according to claim 1, wherein
the identification information of the electronic device comprises information stored in a memory of the electronic device.

7. The information processing device according to claim 1, wherein
the identification information of the electronic device comprises a communication identifier assigned to the electronic device.

8. The information processing device according to claim 1, wherein
the identification information of the electronic device comprises a product number of the electronic device.

9. An information processing method comprising:
determination processing of determining a registration procedure for registering, via an access point, an electronic device including a communication module with a management system that manages the electronic device, the registration procedure being executed by using one application not depending on identification information of the electronic device and a type of version information of the communication module, wherein
the determination processing includes:
first processing of transmitting, to the electronic device, a request signal requesting transmission of the identification information of the electronic device and the version information of the communication module;
second processing of receiving a response signal responding to the request signal from the communication module; and
third processing of (i) determining, when the response signal has been received, the registration procedure based on the identification information of the electronic device and the version information of the communication module, which are included in the response signal and (ii) determining, when the response signal has not been received, a default procedure as the registration procedure regardless of the identification information of the electronic device and the version information of the communication module.

10. A non-transitory computer-readable recording medium having a program recorded thereon for causing one or more processors to execute the information processing method according to claim 9.

11. The information processing method according to claim 9, wherein the identification information of the electronic device comprises information specific to the electronic device.

12. The information processing method according to claim 9, wherein the identification information of the electronic device comprises information stored in a memory of the electronic device.

13. The information processing method according to claim 9, wherein the identification information of the electronic device comprises a communication identifier assigned to the electronic device.

14. The information processing method according to claim 9, wherein the identification information of the electronic device comprises a product number of the electronic device.

* * * * *